Figure 1:
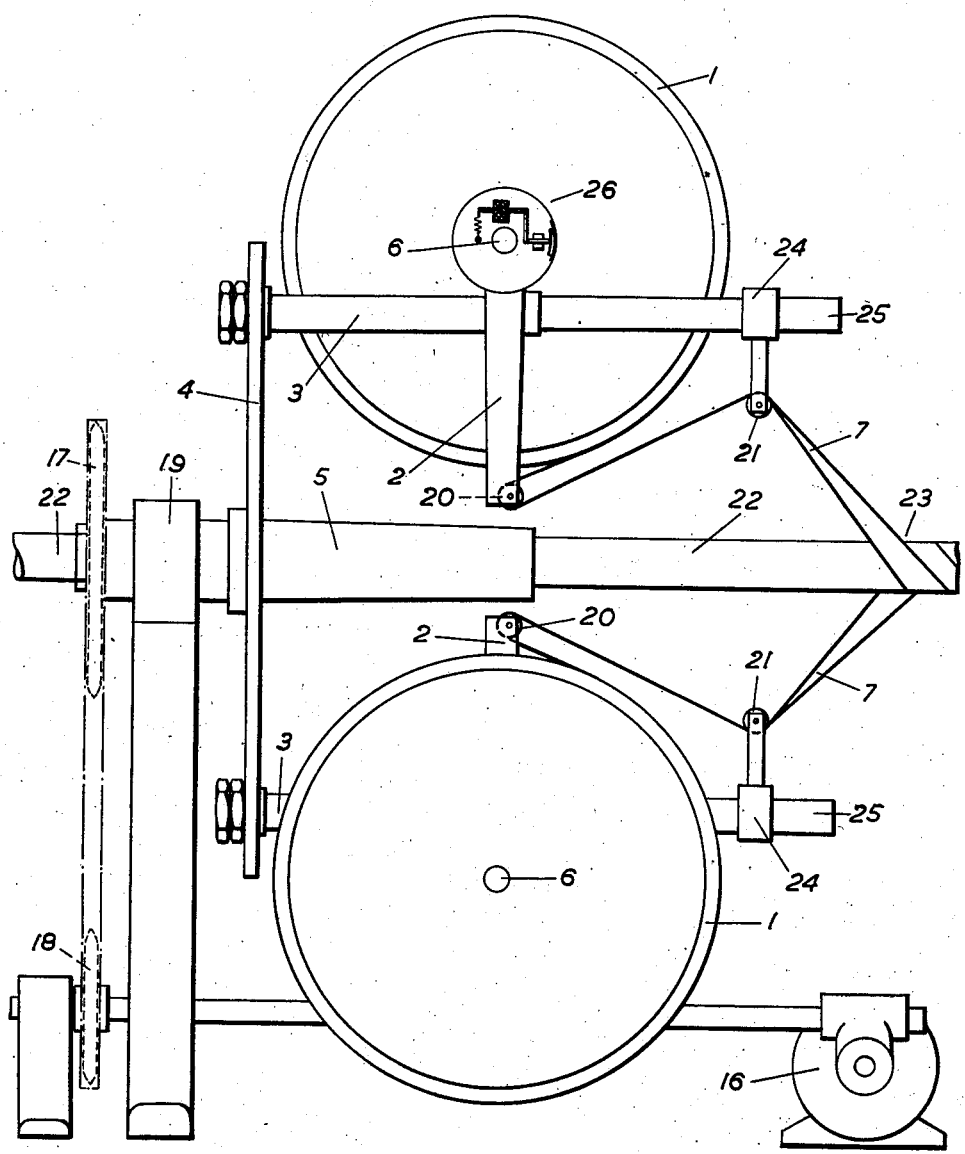

Dec. 2, 1952 — G. T. W. GRIEVE — 2,619,788
MEANS FOR CONTROLLING THE TENSION IN STRIPS
OF PAPER, YARN, AND OTHER LONG FLEXIBLE
MEMBERS WHEN BEING DRAWN FROM A CARRIER
Filed June 30, 1951 — 2 SHEETS—SHEET 1

FIG.I.

Inventor
G.T.W. Grieve
By
Webb Mackey & Burden
Attorney

Dec. 2, 1952 G. T. W. GRIEVE 2,619,788
MEANS FOR CONTROLLING THE TENSION IN STRIPS
OF PAPER, YARN, AND OTHER LONG FLEXIBLE
MEMBERS WHEN BEING DRAWN FROM A CARRIER
Filed June 30, 1951 2 SHEETS—SHEET 2

Inventor
G.T.W. Grieve
By
Mackey + Burden
Attorney

Patented Dec. 2, 1952

2,619,788

UNITED STATES PATENT OFFICE 2,619,788

MEANS FOR CONTROLLING THE TENSION IN STRIPS OF PAPER, YARN, AND OTHER LONG FLEXIBLE MEMBERS WHEN BEING DRAWN FROM A CARRIER

George Thomas Wilson Grieve, Woolwich, London, England, assignor to British Insulated Callender's Cables Limited, London, England, a British company Application June 30, 1951, Serial No. 234,506
In Great Britain July 7, 1950

4 Claims. (Cl. 57—13)

When a strip of paper, fabric, or other material is being lapped on to an electric conductor, the strip in the form of a flat spiral coil or "pad" is held on a carrier comprising a spindle and a pair of discs and the whole is rotated bodily about the axis of the cable, the strip being drawn off over suitable guides so as to be lapped helically with precision about the conductor. Tension is applied to the strip at the coil holder by the bearing friction and by a brake. It is also applied by friction at the guides. The total tension in the strip is produced by a combination of these effects in varying proportions according to the design of the machine and according to the particular conditions of operation.

By the nature of this case there are two principal causes operating to produce variation of the tension in the strip. One of these is the change in the diameter of the coil as the strip is drawn off; the other is the change of centrifugal loading on the bearings of the coil and of the guides as the speed of rotation about the axis of the cable changes during starting and stopping of the machine. These two causes of variation have to be dealt with if it is desired to have constant tension in the strip.

The present invention deals with the second of these two causes and in accordance with it a variation in the braking force on the carrier of the coil is produced under the influence of centrifugal force to compensate the variation of the centrifugal loading on the bearings as the speed changes. To produce this compensation a brake shoe is arranged on a drum attached to the carrier of the coil and is pressed against the drum by a spring which is counterbalanced to a greater or less extent by centrifugal force produced when the carrier and the drum rotate about the axis of the conductor. The spring is set to give a braking effect at very slow rotation which is equal to that produced at full speed rotation by centrifugal force as a friction loss at the bearings of the carrier and of any other bearings over which the strip runs, such as bearings of guide rollers. The force of the spring is opposed and gradually reduced in effect by a centrifugal force exerted by a balance mass with or without the assistance of the mass of the brake shoe and connected parts.

It is preferable to place the brake shoe on the drum in a position in which it acts along a line at right angles to a radius from the axis about which the carrier and the head of the machine in which it is mounted rotate drawn to the centre of the drum, so that the centrifugal force due to the mass of the shoe and directly associated parts does not influence the loading of the shoe.

Figure 2:
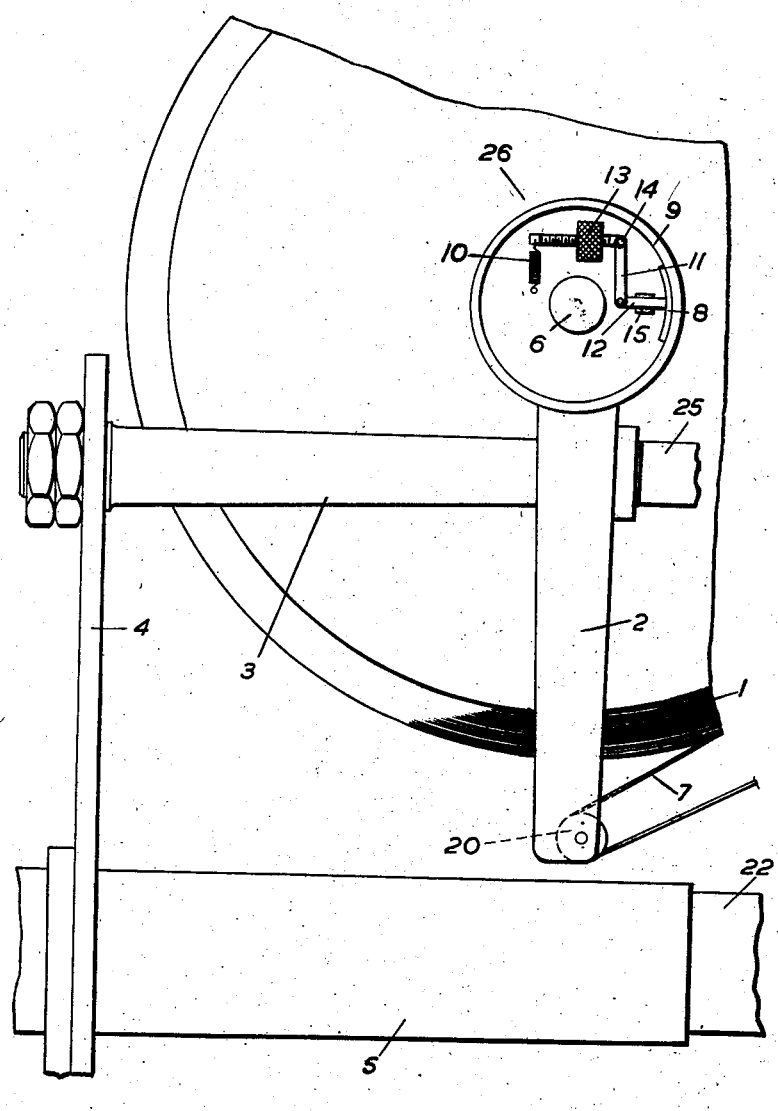

An example of an apparatus in accordance with the invention will be described with reference to the accompanying drawings wherein:

Figure 1 is a general view of a part of a cable manufacturing machine incorporating the invention; and Figure 2 is a view of a portion of Figure 1 to a larger scale.

The apparatus is of the type in which coils 1, 1 of paper strip 7 are carried each on an arm 2 secured to a spindle 3 which projects at right angles from a disc support 4. The disc support 4 is secured to a tubular hub 5 and is rotated with the hub about its axis. The hub 5 is supported in a bearing 19 and is provided with a chain gear wheel 17 through which the rotation is derived from a motor 16 and driving gear 18. The conductor 22 to be covered passes centrally through the hub 5 from left to right. Each coil 1 is mounted, with its central plane nearly radial to the axis of the disc 4, on a spindle 6 carried by the arm 2 and is free to rotate about this spindle 6 subject to braking forces which are controlled in such a way as to maintain an appropriate tension on the strip 7 as it unwinds from the coil 1. The strip 7 after leaving the coil 1 passes over suitable guide 20 mounted on the arm 2 and another guide 21 mounted on a bracket 24 fixed to a forward extension 25 of the spindle 3 and is helically applied about the conductor 22 at a point 23 due to the rotation of the disc 4 with its associated elements.

In accordance with the invention in addition to other braking arrangements which may be provided, there is applied to the coil 1 a braking device generally indicated as 26 and described hereinafter in more detail with reference to Figure 2. This device comprises a brake shoe 8 which is forced against the inner surface of a brake drum 9 mounted on the same spindle 6 as the coil 1. The brake shoe 8 is normally forced into contact with the surface of the brake drum by the action of a tension spring 10 through a linkage consisting of a bell crank lever 11 and an arm 12 on which the brake shoe 8 is mounted. On the horizontal arm of the bell crank lever 11 there is adjustably mounted a small weight 13. The pivot 14 of the bell crank lever, the anchorage for the spring 10 and guides 15 for the arm 12 are supported, independently of the brake drum, in brackets (not shown) attached to the arm 2.

It will be seen that with this arrangement the centrifugal force due to the horizontal arm of the bell crank lever 11 and the mass 13 mounted on it acts in opposition to the tension spring 10. By appropriately setting the initial tension of the spring 10 and by correctly placing the movable mass 13 on its lever arm, it can be provided (a) that at very slow speeds of rotation of the disc 4 the braking effect of the shoe 8 is equal to that which at full speed will be produced by the centrifugal loading of the bearings of the carrier for the coil 1 and the bearings of guides 20 and 21 over which the strip 7 passes and (b) that as the speed increases from slow to full speed the action of the centrifugal force of the parts indicated counterbalances the effect of the spring 10 until at full speed the balance becomes complete and the brake no longer acts.

The brake is supplemental to, but may operate on the same drum as, any other brake which may be used to maintain tension in the strip 7 at normal speed.

What I claim as my invention is:

1. Apparatus for lapping a strip of flexible material onto an electric conductor comprising a carrier for a coil of said strip, means for rotating said carrier and said coil bodily about the axis of said conductor, means for guiding said strip from said coil onto said conductor, braking means resisting the uncoiling of said strip and means for automatically varying said braking under the action of centrifugal force as the speed of rotation of said carrier about said conductor varies, increase in said speed of rotation decreasing said braking.

2. Apparatus for lapping a strip of flexible material onto an electric conductor comprising a carrier for a coil of said strip, a rotatable support for said coil on said carrier, means for rotating said carrier and said coil bodily about the axis of said conductor, means for guiding said strip from said coil onto said conductor, a brake drum mounted on said rotatable support, a brake shoe acting on said drum, a spring adapted to press said brake shoe onto said drum and a balance mass counterbalancing the force of said spring to an extent which increases, under centrifugal force, as the speed of rotation of said carrier about said conductor increases.

3. Apparatus for lapping a strip of flexible material onto an electric conductor comprising a carrier for a coil of said strip, a rotatable support for said coil on said carrier, means for rotating said carrier and said coil bodily about the axis of said conductor, means for guiding said strip from said coil onto said conductor, a brake drum mounted on said rotatable support, a brake shoe acting on said drum, a spring adapted to press said brake shoe onto said drum, guide means for supporting said shoe to move in a direction at right angles to a radius from the axis about which said carrier rotates drawn to the centre of said drum and a balance mass counterbalancing the force of said spring to an extent which increases, under centrifugal force, as the speed of rotation of said carrier about said conductor increases.

4. Apparatus for lapping a strip of flexible material onto an electric conductor comprising a carrier for a coil of said strip, a rotatable support for said coil on said carrier, means for rotating said carrier and said coil bodily about the axis of said conductor, means for guiding said strip from said coil onto said conductor, a brake drum mounted on said rotatable support, a brake shoe acting on said drum, a spring adapted to press said brake shoe onto said drum, a mechanical linkage between said spring and said brake shoe including a pivoted lever and a balance mass adjustably mounted on said lever to pivot said lever and counterbalance the force of said spring to an extent which increases under centrifugal force, as the speed of rotation of said carrier about said conductor increases.

GEORGE THOMAS WILSON GRIEVE.

No references cited.